Dec. 10, 1940.                A. DESFACHELLES                2,224,596
CONTROL DEVICE
Filed Nov. 25, 1938
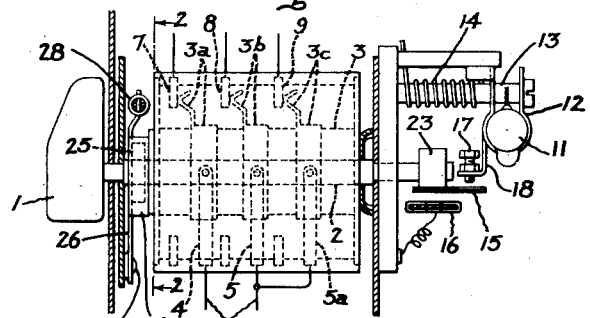
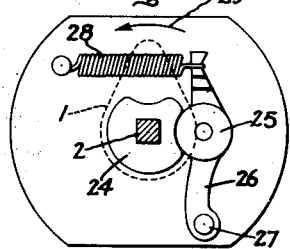 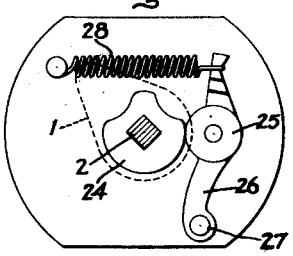 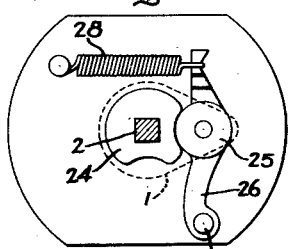
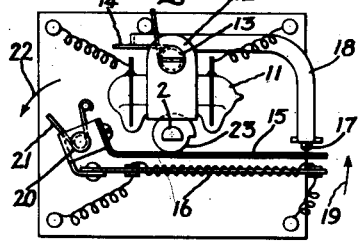 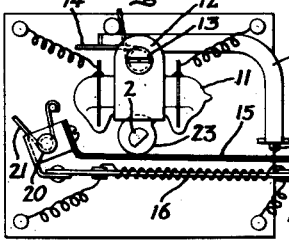 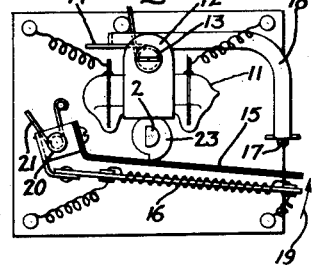
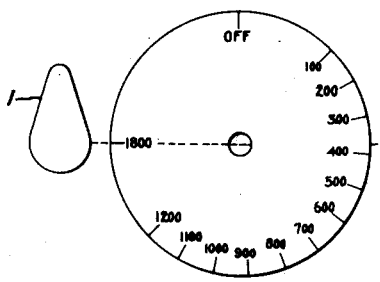 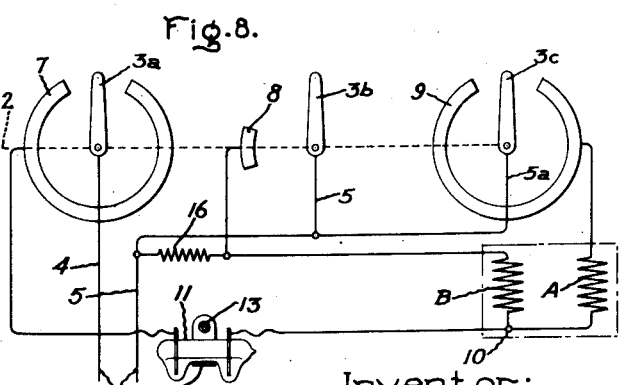
Inventor:
Alexandre Desfachelles,
by Harry E. Dunham
His Attorney.

Patented Dec. 10, 1940

2,224,596

UNITED STATES PATENT OFFICE 2,224,596

CONTROL DEVICE

Alexandre Desfachelles, A Ronchin, Nord, France, assignor to General Electric Company, a corporation of New York Application November 25, 1938, Serial No. 242,404
In France November 30, 1937

6 Claims. (Cl. 219—20)

This invention relates to control devices, more particularly to control devices for heating apparatus, such as the hot-plates of an electric range, and it has for its object an improved device of this character.

It has been already proposed to supply electric resistance-type heating apparatus intermittently and to effect the regulation of the heating by varying the relative duration of the successive periods during which the heating resistances are supplied and during which no power supply reaches the resistances. This method of regulation amounts to varying the average power which is supplied to the heating resistances, and it provides for a gradual variation in the mean power from a minimum value which may be equal to zero up to a maximum value corresponding to the permanent power supply.

In apparatus which are provided with notch-type means of regulating the rate of heating, for instance in apparatus whose heating resistance is subdivided into several sections which may be coupled in series or in parallel, or which may be utilized separately, the regulation according to intermittent supply, whose principle has just been recorded, may be superimposed on the notching regulation, so as to permit a progressive regulation starting from each or from some of the heating levels, corresponding to the notch regulation. The combinations of this type which have been known so far comprise two handles or other similar parts for controlling the regulation, which are quite distinct one from the other; one of these controlling handles regulates the notches, while the other takes care of the gradual regulation.

Such an arrangement has shortcomings, especially in electric apparatus for cooking purposes, such as heating plates, ovens, kitchen ranges, etc., whose utilization is complicated by that arrangement, since it entails groping and is likely to bring about false maneuvers.

The present invention avoids these shortcomings. This invention is especially directed to the regulation of electric kitchen appliances involving electric heating. However, it can be generally applied to all electric heating apparatus which comprises a superimposition or a combination of a regulation by notches and of progressive regulation according to the intermittent method; for that application simplifies the control of the heating apparatus by increasing the reliability of the maneuvers while at the same time it reduces the size of the regulating devices.

In a copending application of Wallace J. Ettinger and Russell A. Winborne, Serial No. 337,758, filed May 7, 1940, there are described and claimed features which are incorporated in the control device of the present application in which switch means are provided to energize one heating resistance or more than one to provide different degrees of heat, and furthermore, a control element is provided to control the average power supplied to the one resistance when it is energized. A single control member controls the operation of the switch means and the control element so that when the control member is operated through one range of movement the one resistance only is energized, and the average power supplied to it is controlled, and when in another position, the plurality of resistances are energized to effect a constant degree of heat; in this latter position of the control member, the control element is rendered ineffective to control the average power supplied.

In accordance with this invention, a master switch is provided for establishing the heating connections so that either one or more than one resistance may be energized to provide different degrees of heat, and a second switch is provided for controlling the average power supplied to the one resistance when it is energized. A regulator controls the second switch to control the average power supplied. This regulator and the master switch are under the control of a single control member.

For a more complete understanding of this invention, reference should be had to the accompanying drawing in which Fig. 1 is a side elevation of a control device arranged in accordance with this invention; Fig. 2 is a view taken along the lines 2—2 of Fig. 1 and looking in the direction of the arrows; Fig. 3 is an elevation illustrating certain elements of the control device and occupying positions corresponding to the position of the control knob shown in Fig. 2; Figs. 4 and 5 are similar to Figs. 2 and 3 respectively, but illustrate certain elements in different operative positions; Figs. 6 and 7 are similar to Figs. 2 and 3 respectively but illustrating certain parts in still other operative positions; and Fig. 8 is a diagrammatic representation of certain of the elements of the control device of Fig. 1 and also of certain heating resistance elements controlled by the control device.

The attached schematic drawing represents a physical embodiment given by way of a non-limiting example of the invention. This example is assumed, in order to facilitate the description, to refer to the regulation of a heating plate for cooking purposes, comprising a resistance which is divided into two sections, A and B; section A may for example produce 1200 watts, while resistance B may produce 600 watts. It has been besides assumed that the notch-type regulation is to comprise three levels; all power supply is cut off; that is the zero position (no power); a section of resistance A alone is supplied (power= 1200 watts); sections A and B are supplied in parallel (power=1800 watts); the progressive regulation is assumed to cover the whole range from zero to 1200 watts.

The single control element is here shown as a handle 1, which actuates a shaft 2 on which is keyed a rotating drum 3 that carries the movable contacts 3a, 3b and 3c of the change-over switch that brings about the notch-type regulation. This change-over switch is here assumed to be of the drum type and its movable contacts make, depending upon the position of handle 1, the necessary variable connections between the fixed contacts 4, 5 and 5a that are connected to the supply line 6, as shown, and the fixed contacts 7, 8 and 9 that are connected respectively to the common point 10 of the sections A and B of the heating resistance and to the free ends of these sections.

The supply according to the intermittent method is assumed to be obtained by means of a mercury tilting or rocking switch 11, inserted between 7 and 10; this rocking switch is carried by a cradle 12 which oscillates about the fixed shaft 13 and is held by a spring 14 in the closing position; that is to say, the horizontal position. The bimetallic strip 15 which becomes deformed under the influence of the heat which it receives from a heating element 16 when the latter is energized, pushes, when a certain temperature is reached, (corresponding to a given supply time of that heating element) the extremity—provided with a regulating screw 17—of a lever 18 carried by the oscillating cradle 12 on which is mounted the rocker; in this manner the bimetallic strip 15 introduces the power supply to the heating resistance by causing the rocker to oscillate in the direction of arrow 19 against the effect of spring 14. The bimetallic strip 15 together with the heating element 16 are mounted on a shaft 20, and a spring 21 tends to rotate this system in the direction of arrow 22 (Fig. 3). A cam wheel 23, which is actuated by the shaft 2, permits removing (against the spring 21) the system 15—16 from the extremity 17 of the oscillating lever 18, or permits bringing it closer to that extremity 17, consequently to increase or decrease the duration of the supply periods for the heating resistance (progressive regulation of the heating). The mechanism for marking the notches comprises a cam wheel 24 which is actuated by the shaft 2 and with which cooperates a roller 25 which is held against cam wheel 24 by a lever 26 articulated on a fixed shaft 27 which is under the influence of a tension spring 28.

The operation is as follows: We start from the position of Figs. 1, 2, 3 and 8, where all supply is interrupted, cam wheel 24 being keyed on shaft 2 in such a way that the roller is engaged by one of its notches, and cam 23 being keyed in such a way that the free extremity of the bimetallic strip 15 comes nearly in contact with the extremity 17 of the oscillating lever 18. By causing the handle 1 to rotate in the direction of arrow 29 from position of Fig. 2 to Fig. 4, the section of resistance A is directly supplied by a circuit which may be traced from the supply conductor 4 through the closed switch contact 7, the switch 11, the resistance A, the closed contact 9 and thence to the opposite supply conductor 5. The heating element 16 is supplied at the same time in series with the section of resistance B and the rocker 11 through a circuit which may be traced from the supply conductor 4, the closed contact 7, the switch 11 and thence through the resistance B and the heating element 16 in series to the opposite supply conductor 5. Because of the magnitude of the resistance of 16 with respect to that of B, nearly the entire heat produced is emitted in 16, and, inasmuch as the energy expended in B is negligible, everything is as if the section B had remainder unutilized; the rocker 11 is actuated (the circuit of the heating element 16 being interrupted at the same time as that of A), and the section of resistance A is supplied according to the intermittent method. At the beginning of the rotation of handle 1, the free extremity of the bimetallic strip 15 being initially very close to 17, the duration of the supply periods for A is very short and the power very low. By turning the handle 1 gradually in the direction of the arrow 29 (Fig. 2) the duration of the supply periods for A and consequently its heating capacity is gradually increased. This operation of the handle, as will be understood, moves the thermostat away from the screw 17.

During this entire part of the rotation of handle 1, the roller 25 rests on the circular part of the profile of cam wheel 24 and the spring 28 applies a sufficient pressure so that this handle 1 rests in any position in which it is left.

When one reaches the extremity of the circular part of the profile of cam 24, the cam wheel 23 has removed the system 15—16 from 17 to a sufficient distance so that the supply of A becomes permanent: capacity=1200 watts. By continuing to rotate the handle 1 in the direction of arrow 29, the cam wheel 24 reaches the position shown in Fig. 6, and the sections of resistances A and B are supplied simultaneously and permanently in parallel, the heating element 16 being shorted out by closing contact 8 which operation also maintains the connection through the resistance B.

By continuing the rotation of handle 1 in the direction of arrow 29, it is returned to the "Off" position shown in Fig. 8, and by rotating handle 1 in the opposite sense, one would obtain, in the reverse order, the same regulations.

While I have shown a particular embodiment of my invention, it will be understood, of course, that I do not wish to be limited thereto since many modifications may be made, and I, therefore, contemplate by the appended claims to cover any such modifiactions as fall within the true spirit and scope of my invention.

What I claim as new and desire to secure by Letters Patent of the United States is:

1. A control device for an electric hotplate having a pair of heating resistances comprising switching means operable to selected controlling positions to connect said resistances to a supply source to provide a plurality of different heats, a control member operating said switching means to said controlling positions so that when said control member is moved in one direction from an off position it connects one of said resistances to the full voltage of said supply source to provide one heat, a thermally responsive switch operable to control the connections to said one resistance to regulate the average power supply to it and controlled by said control member to increase gradually the power input to said one resistance to provide higher and higher heats as said control member is advanced in said one direction, said control member upon further movement in said direction rendering said thermally responsive switch ineffective to regulate average power so that one resistance provides constant heat and upon still further movement in said one direction connecting said two resistances to the full voltage of said supply source to provide a still higher constant heat for said hotplate.

2. In a heating system having a pair of heating resistances and an electrical supply source for the resistances, a switch arranged in one position to connect at least one of said resistances to the supply source so that the full voltage of the supply source is impressed on said resistance, and in another position the two resistances are connected in parallel with the full voltage of the supply source impressed on them, a control knob for operating said switch to said positions, a second switch controlling said one resistance, a thermostat controlling the operation of said second switch intermittently to control the average power supplied to said one resistance, an auxiliary heater for heating said thermostat intermittently controlled by the thermostat to cut off heat from said thermostat when power is removed from said one resistance and to reapply heat to said thermostat when power is reapplied to said one resistance, means operated by said control knob for adjusting said thermostat to vary the power input to said one resistance, and means operated by said control knob for turning off said auxiliary heater and rendering said thermostat ineffective when said first switch is moved to its position to connect both of said resistances to said supply source.

3. In a heating system having a pair of heating resistances and an electrical supply source for the resistances, a control device for said resistances comprising a shaft, a switch operated by said shaft to connect one of said resistances to the supply source so that the full voltage of the source is impressed on it in one position of the shaft, and to connect the two resistances to the source to impress its full voltage on them in another position of the shaft, a thermostatically operated switch connected in the circuit of said one resistance operating to regulate the power supplied to the resistance, said thermostatically operated switch having a bimetallic operating bar and a heater for applying heat to the bar to move it to operate the switch to cut said one resistance from the supply source, said heater controlled by said bar to remove heat from the bar at the same time said one resistance is cut from the supply source so that the bar cools to reconnect said one resistance to said source and said heater controlled by the bar to restore heat to the bar at the same time said one resistance is reconnected to said source, a cam operated by said shaft when moving between said two positions to control the position of said bimetallic bar so as to vary the power supplied to said one resistance and functioning to render the thermostatic bar inoperative when the shaft is moved to said other position when both of said resistances are connected to said supply source, and positioning means for locating said shaft in said two positions.

4. In a heating system having a pair of heating resistances and an electrical supply source for the resistances, a control device for said resistances comprising a shaft, a switch operated by said shaft to connect one of said resistances to the supply source so that the full voltage of the source is impressed on it in one position of the shaft, and to connect the two resistances to the source to impress its full voltage on them in another position of the shaft, a liquid contact switch connected in the circuit of said one resistance to make and break said circuit depending on the position of said switch, means movably mounting said switch, an operating member for said switch, a thermostat controlling said operating member to vary the position of said switch, a heater for heating said thermostat intermittently controlled by the thermostat to cut heat from it when the thermostat moves said liquid contact switch to cut off power from said one resistance and to reapply heat to the thermostat when it operates to move the switch to reapply power to said one resistance, and means operated by said shaft for varying the relation of said thermostat to said operating member to vary the operation of said liquid contact switch by said thermostat so that varying degrees of power are supplied to said one resistance at different positions of said shaft.

5. In a heating system having a pair of heating resistances and an electrical supply source for said resistances, means for controlling said resistances comprising a thermostatically operated timing switch and a master switch, the latter operating through said thermostatically operated switch in a series of positions to connect one only of said resistances to said supply source and in another position to connect both of said resistances to said supply source, said thermostatically operated switch being rendered ineffective to govern the power supply to said resistances when said master switch is in said other position and rendered effective to control the average power supplied to said one resistance when said master switch is in any one of said series of positions and supply different average powers to said one resistance for each of said series of positions.

6. In a heating system having a pair of heating resistances and an electrical supply source for said resistances, control means for said system comprising a switch adapted to be connected in the connections between said supply source and said resistances, a thermostat for operating said switch, an auxiliary heater for applying heat to said thermostat, a master switch adapted to control said connections arranged in one position to connect both of said resistances to said supply source while said auxiliary heater remains unenergized so that the two resistances supply a constant high heat, and in a series of other positions to connect one of said resistances together with said auxiliary heater to said supply source and to control the operation of said thermostatically operated switch so that said switch operates to control the average power supply to said one resistance, the average power supply depending upon the position of said master switch whereby said one resistance generates different degrees of heat depending upon the position of said master switch.

ALEXANDRE DESFACHELLES.

DISCLAIMER 2,224,596.—*Alexandre Desfachelles*, A Ronchin, Nord, France. CONTROL DEVICE.
Patent dated December 10, 1940. Disclaimer filed June 23, 1943, by the assignee, *General Electric Company*.
Hereby disclaims claim 5.
[*Official Gazette July 13, 1943.*]